United States Patent
Okita

(10) Patent No.: US 10,114,360 B2
(45) Date of Patent: Oct. 30, 2018

(54) NUMERICAL CONTROLLER

(71) Applicant: FANUC Corporation, Minamitsuru-gun, Yamanashi (JP)

(72) Inventor: Hiroshi Okita, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 442 days.

(21) Appl. No.: 14/717,200

(22) Filed: May 20, 2015

(65) Prior Publication Data

US 2015/0338843 A1    Nov. 26, 2015

(30) Foreign Application Priority Data

May 26, 2014    (JP) ................................ 2014-108335

(51) Int. Cl.
| | | |
|---|---|---|
| *G06F 19/00* | (2018.01) | |
| *G05B 19/406* | (2006.01) | |
| *G05B 19/4068* | (2006.01) | |

(52) U.S. Cl.
CPC ....... *G05B 19/406* (2013.01); *G05B 19/4068* (2013.01); *G05B 2219/31356* (2013.01); *Y02P 90/14* (2015.11)

(58) Field of Classification Search
CPC .............. G05B 19/406; G05B 19/4068; G05B 2219/31356; Y02P 90/14
USPC ....................................................... 700/180
See application file for complete search history.

(56) References Cited

U.S. PATENT DOCUMENTS

| | | | | |
|---|---|---|---|---|
| 5,274,546 A | * | 12/1993 | Kinoshita ......... | G05B 19/4063 700/81 |
| 2009/0164038 A1 | * | 6/2009 | Bretschneider .... | G05B 19/4063 700/105 |
| 2009/0248194 A1 | * | 10/2009 | Lammering ....... | G05B 19/4163 700/173 |
| 2014/0298099 A1 | * | 10/2014 | Tan ..................... | G05B 19/406 714/37 |

FOREIGN PATENT DOCUMENTS

| | | |
|---|---|---|
| JP | H02-158808 A | 6/1990 |
| JP | H02-226307 A | 9/1990 |
| JP | H05-150818 A | 6/1993 |
| JP | H05-158524 A | 6/1993 |
| JP | H07-234987 A | 9/1995 |

(Continued)

OTHER PUBLICATIONS

Notification of Reasons for Refusal dated Dec. 27, 2016 in Japanese Patent Application No. 2014-108335 (3 pages) with an English translation (3 pages).

*Primary Examiner* — Mohammad Ali
*Assistant Examiner* — Md Azad
(74) *Attorney, Agent, or Firm* — Drinker Biddle & Reath LLP

(57) ABSTRACT

A numerical controller for controlling a machine tool based on a processing program is disclosed. One numerical controller includes: a detecting unit that detects a factor which causes malfunction of the numerical controller; a storing unit that stores information of a block of the processing program which is being executed and information of the factor in association with each other; and a display unit that displays information of the detected factor on a location corresponding to a display location of the block of the processing program.

15 Claims, 6 Drawing Sheets

(56) References Cited

FOREIGN PATENT DOCUMENTS

| | | |
|---|---|---|
| JP | 2001-282314 A | 10/2001 |
| JP | 2003-308107 A | 10/2003 |
| JP | 2005-276046 A | 10/2005 |

* cited by examiner

| ADDRESS | bit7 | bit6 | bit5 | bit4 | bit3 | bit2 | bit1 | bit0 |
|---------|------|------|------|------|------|------|------|------|
| Y100 | 0 | 1 | 1 | 0 | 1 | 0 | 1 | 0 |
| Y101 | 1 | 1 | 0 | 0 | 0 | 0 | 0 | 0 |
| Y102 | 0 | 0 | 1 | 1 | 1 | 0 | 1 | 1 |
| Y103 | 1 | 0 | 1 | 0 | 0 | 0 | 1 | 1 |

NUMERICAL CONTROLLER

RELATED APPLICATION DATA

This application claims priority under 35 U.S.C. § 119 and/or § 365 to Japanese Application No. 2014-108335 filed May 26, 2014, the entire contents is incorporated herein by reference.

BACKGROUND OF THE INVENTION

1. Field of the Invention

The present invention relates to a numerical controller, and more particularly, to a numerical controller capable of detecting noise, power flicker, an impact and the like which become factors of malfunction of a device, and capable of narrowing down causes of the factors.

2. Description of the Related Art

FIGS. 12 and 13 are diagrams for describing detection data of a machine tool which is controlled by a conventional numerical controller. As shown in FIG. 12, the machine tool 10 is composed of: a numerical controller 20; an amplifier 30, a motor 40 and an I/O unit 50 which are controlled by the numerical controller 20; a table and a tool rest 60 driven by the motor, and a peripheral device 70 operated by a signal from the I/O unit.

As shown in FIG. 13, when the machine tool 10 operates, the numerical controller 20 processes a ladder program and sends a control signal to the I/O unit 50. The I/O unit 50 receives the control signal and operates, sends an I/O signal to the connected peripheral device 70, and operates the peripheral device 70. The peripheral device 70 has an inductive load such as a relay and a solenoid valve as well as a capacitive load such as a lamp, but these operations become factors which cause noise and power flicker. The noise and the power flicker become factors which cause intermittent malfunction of the numerical controller 20.

The numerical controller 20 processes a processing program, and sends a control signal to the amplifier 30. The amplifier 30 receives the control signal and drives the motor 40, and the table and the tool rest 60 mounted on the motor 40 operate. If the table and the tool rest 60 operate with abrupt acceleration or deceleration, an impact generates. A strong impact and an intermittent impact continuing for a long time become factors which damage parts of the numerical controller 20.

As countermeasure against noise, power flicker, an impact and the like, JP 2003-308107 A discloses a device incorporating a detecting unit therein and capable of specifying a generation state, generation time and magnitude of a factor which causes malfunction of a device.

According to this conventional technique, it is possible to detect a generation state, generation time and magnitude of a factor which causes malfunction of a device. However, to take countermeasure against a cause of the factor, it is necessary to individually operate a table, a tool rest and a peripheral device while checking information from the detecting unit, and to check the noise, power flicker and an impact, and deserved effort and time are required to specify a cause of a factor which causes malfunction.

Further, operation of a peripheral device controlled by a ladder program of the numerical controller, and operations of a table and a tool rest controlled by a processing program are related to noise, power flicker, an impact and the like generated due to operation in a machine tool, but in operation of an actual machine, operations of the table and the tool rest are different from each other due to the processing program, and a plurality of motors operate at the same time in some cases. A plurality of peripheral devices are simultaneously operated by the processing of the ladder program which controls input and output in some cases, but it is difficult to replicate such motion when a factor is specified and researched.

SUMMARY OF THE INVENTION

Hence, it is an object of the present invention to provide a numerical controller capable of narrowing down a cause of a factor which causes malfunction of a device such as noise, power flicker and an impact.

The numerical controller of the present invention controls a machine tool based on a processing program. The numerical controller includes: a detecting unit configured to detect a factor which causes malfunction of the numerical controller; a storing unit configured to store information of a block of the processing program which is being executed and information of the factor detected by the detecting unit in association with each other; and a display unit configured to display information of the detected factor on a location corresponding to a display location of the block of the processing program based on the information stored in the storing unit.

The numerical controller of the present invention controls a machine tool based on a ladder program. The numerical controller includes: a detecting unit configured to detect a factor which causes malfunction of the numerical controller; a storing unit configured to store information of an I/O address which changes immediately before the factor is generated and information of the factor detected by the detecting unit in association with each other; and a display unit configured to display information of the detected factor on a location corresponding to a display location of the I/O address of the ladder program based on the information stored in the storing unit.

The numerical controller of the present invention controls a machine tool based on a ladder program. The numerical controller includes: a detecting unit configured to detect a factor which causes malfunction of the numerical controller; a storing unit configured to store information of an I/O address which changes immediately before the factor is generated and information of the factor detected by the detecting unit in association with each other; and a display unit configured to display information of the detected factor on a location corresponding to a display location of the I/O address of an I/O list based on the information stored in the storing unit.

The display unit may include a narrowing-down unit configured to narrow down to and display information of the detected factor corresponding to a specific factor.

According to the above-described configuration of the present invention, of factors which intermittently generate such as noise, power flicker, an impact and the like which causes malfunction of the numerical controller, a generation state of factors which generate due to operations of a table, a tool rest and a peripheral device in a machine tool are displayed on locations corresponding to display locations of the block of the processing program, the ladder program and the I/O address of the I/O list. According to this, it is possible to narrow down a generation cause. Further, if the block of the processing program, the ladder program and the I/O address of the I/O list are displayed while narrowing down to information of a specific factor, it is possible to narrow down a generation cause of a specific factor.

It is possible to also detect test operation of a machine tool, operations of a table and a tool rest when a plurality of motors generated by actual processing are operated at the same time, and to detect factors such as noise, power flicker and an impact generated by operations of a plurality of peripheral devices, and it is possible to display the detected operations and factors.

BRIEF DESCRIPTION OF THE DRAWINGS

These and other objects and features of the present invention will become clear by the following description of an embodiment with reference to the accompanying drawings, wherein.

DETAILED DESCRIPTION OF THE PREFERRED EMBODIMENT

Figure 1:
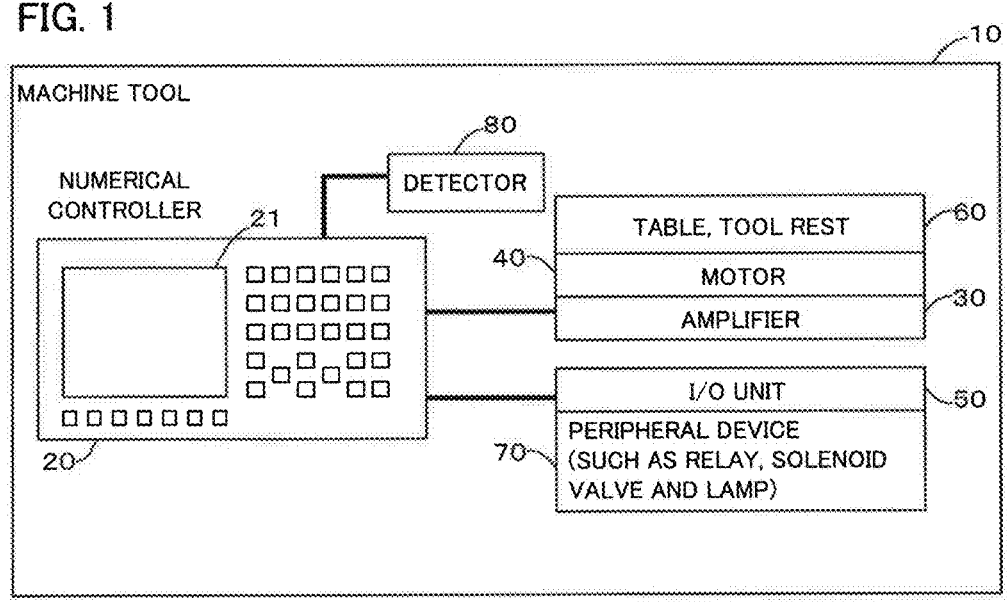
FIG. 1 shows a configuration of a machine tool in which a numerical controller of an embodiment of the present invention is incorporated.

FIG. 1 shows an example of a configuration in which a detector as a detecting unit is mounted outside a numerical controller which is a constituent element of a machine tool. The machine tool 10 is composed of a numerical controller 20 having a display section 21, an amplifier 30 controlled by the numerical controller 20, a motor 40, an I/O unit 50, a table and a tool rest 60 driven by the motor 40, a peripheral device 70 operated by a signal from the I/O unit 50, and a detector 80 for detecting an event which becomes a cause of malfunction of the numerical controller such as generation of noise, power supply means and an impact.

Figure 2:
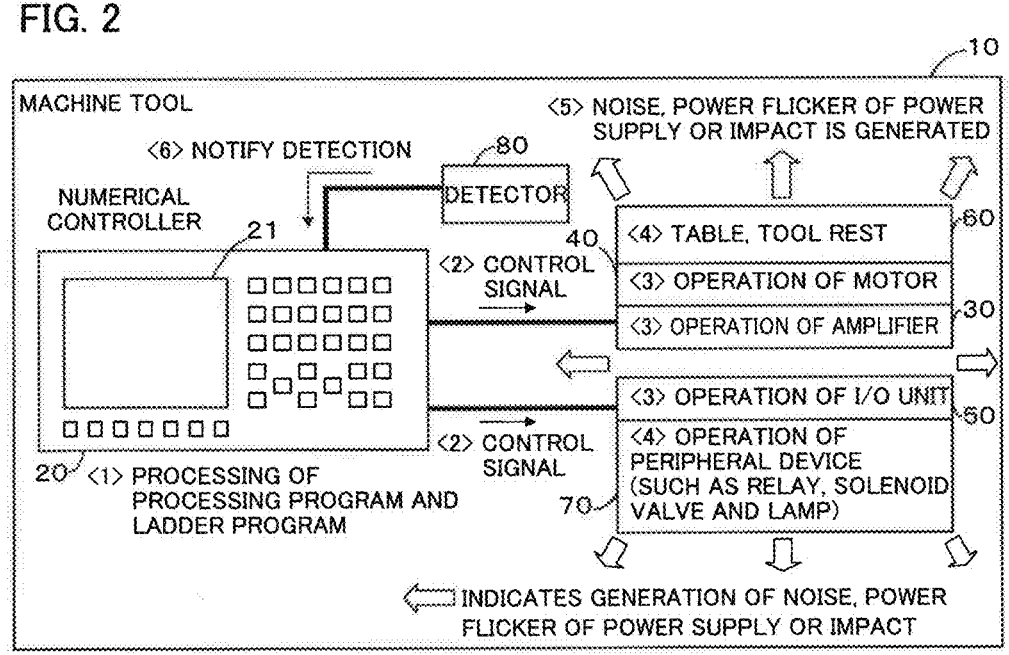
FIG. 2 shows a flow in which the numerical controller of the embodiment of the invention detects a factor.

FIG. 2 is a diagram for describing a state where noise, power flicker and an impact generate when the machine tool 10 is operated. When the numerical controller 20 processes a processing program and a ladder program and outputs a signal for controlling the table, the tool rest 60 and the peripheral device 70, the machine tool 10 operates. Here, if the amplifier 30 drives the motor 40 and the table and the tool rest 60 are operated or the I/O unit 50 operates the peripheral device 70 in accordance with the control signal, noise, power flicker and an impact are generated due to abrupt acceleration and deceleration of the table or the tool rest 60 and ON/OFF operation of a power supply such as an inductive load and a capacitive load of the peripheral device 70.

The detector 80 monitors a generation state such as noise, power flicker or an impact. If the detector 80 detects noise, power flicker and an impact, the detector 80 informs the numerical controller 20 of noise, power flicker and an impact. The detector 80 may inform the numerical controller 20, or the numerical controller 20 may periodically monitor information of the detector 80.

Figures 3, 4:
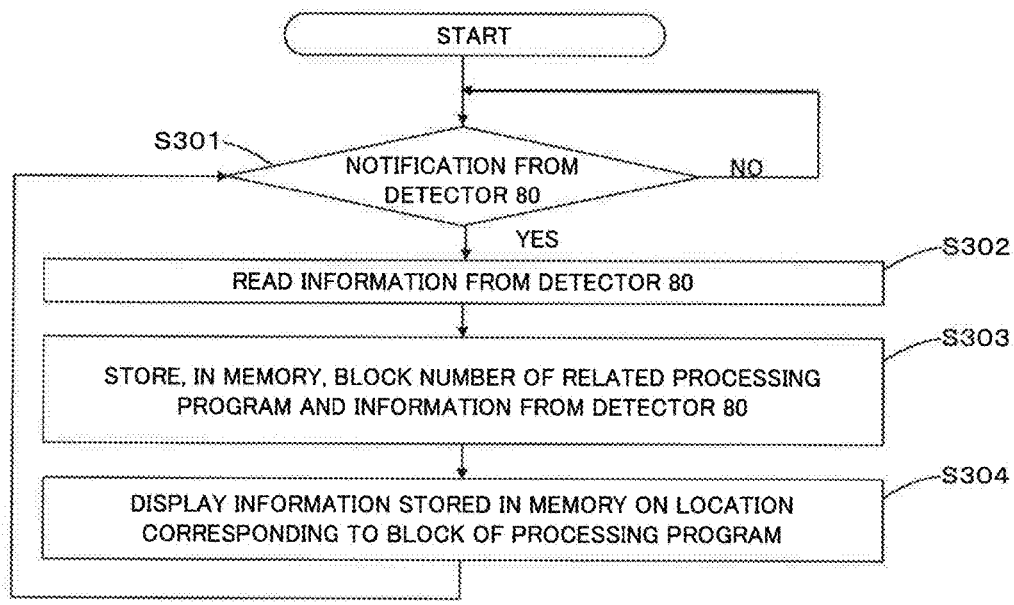
FIG. 3 is a flowchart of display processing of a processing program in the numerical controller of the embodiment of the invention in association with factor information.
FIG. 4 shows an example of a processing program in the embodiment of the invention.

FIG. 3 is a flowchart showing processing procedure in the numerical controller 20 from the instant when the detector 80 detects noise, power flicker or an impact to the instant when detected information is displayed on a location corresponding to a display location of the processing program in this embodiment.

If the numerical controller 20 receives notification from the detector 80 which detects noise, power flicker and an impact (S301), the numerical controller 20 accesses the detector 80, and acquires the detected information (S302). The acquired factor information is stored in a memory (not shown) as detection data in association with a block number of the processing program (S303). If the numerical controller 20 receives display operation instructions of a malfunction factor from an operator, the detected factor is displayed on a location corresponding to a display location of the block of the processing program in the display section 21 based on information of the detection data which is stored in the memory (S304).

Here, a block number which associates information acquired from the detector 80 is a block number of a processing program which is being executed when a notification is received from the detector 80 but generally, communication delay of a control signal to the amplifier 30, the motor 40 and the I/O unit 50, operation delay of the table, the tool rest 60 and the peripheral device 70, detection delay of the detector 80, and notification delay of the detector 80 are generated from processing of a processing program until notification of detection of noise, power flicker and an impact. Hence, notification delay from the detector 80 is taken into consideration, it is possible to employ a configuration that information is stored in association with a plurality of block numbers which are processed before predetermined time from the processing program which is being executed.

To realize such processing, it is possible to employ a configuration that the numerical controller 20 temporality stores, in a memory, an executed processing program for predetermined time. Time during which the executed processing program is temporality stored is set in the numerical controller 20, but as the time becomes shorter, it is possible to more narrow down the block of a processing program which becomes a cause of noise, power flicker and or impact.

Figure 5:
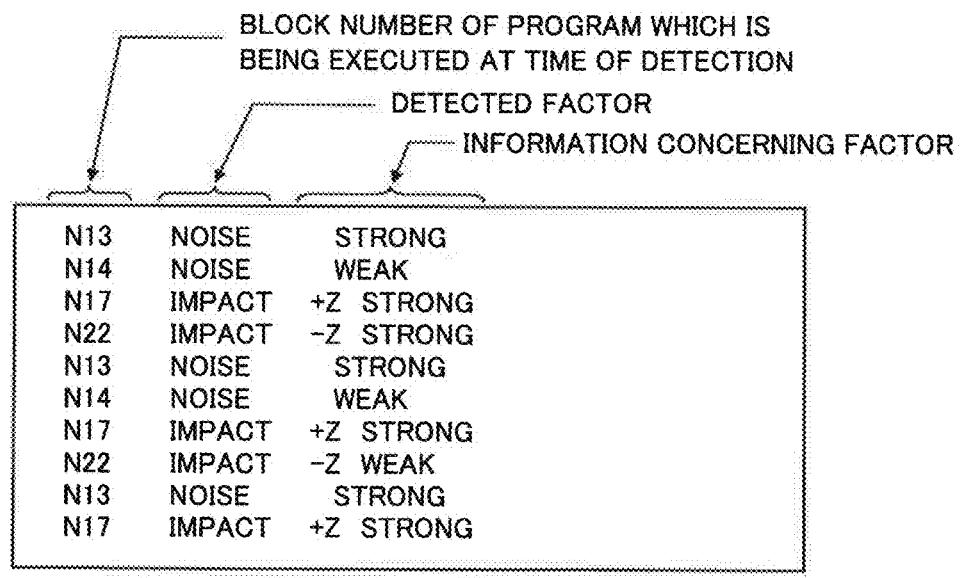
FIG. 5 shows an example of detection data with respect to the processing program in the embodiment of the invention.

FIG. 4 shows an example of a processing program to be executed. FIG. 5 shows an example of detection data when factor information acquired from the detector 80 is stored in the memory in association with a block number of a processing program which is being executed as a result of the fact that the processing program shown in FIG. 4 is executed a plurality of times. Information concerning factors such as a block number of a processing program which is being executed, a detected factor, strength of noise, a direction of an impact, and strength of an impact is included in detection data. It is found that in detection data in FIG. 5, strong noise is detected whenever an N13 block is executed (three times in FIG. 5).

Figure 6:
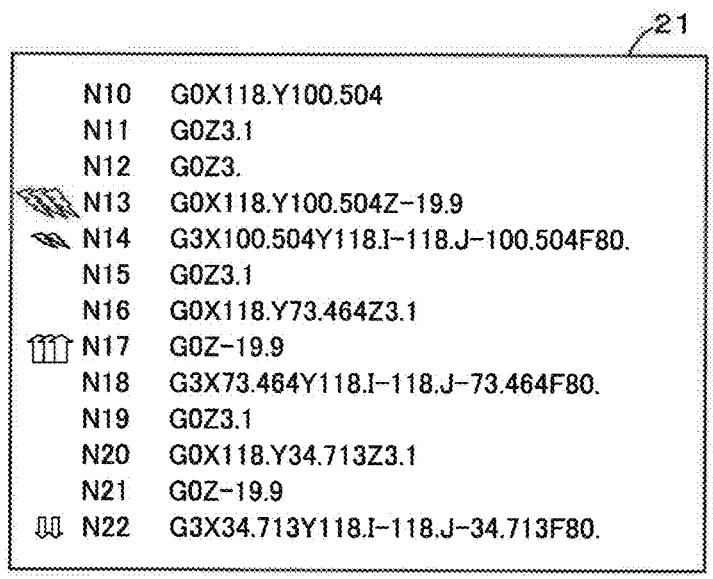
FIG. 6 shows a display example of the processing program in the embodiment of the invention.

FIG. 6 shows a display example when a processing program is displayed on the display section 21 based on the detection data shown in FIG. 5. In the display example, marks showing detected factors are shown on a left side of a block corresponding to the marks in the processing program. This display is not limited to this format only if it is possible to grasp which block is being executed when the detected factor is generated. For example, a factor may be displayed in a superposed manner on a block, or in a speech balloon manner. In FIG. 6, as marks showing factors, detection of noise is shown with a thunder mark, strength is shown with size of the thunder mark, detection times are shown with the number of thunder marks, detection of impact is shown with arrows, a direction of impact is shown with a direction of an arrow, and magnitude of impact is shown with size of arrow. According to FIG. 6, it is immediately obvious that large noise is detected three times as a result of processing of an N13 block, small noise is detected two times as a result of processing of an N14 block, large impact is detected three times in a +Z direction as a result of an N17 block, and small impact is detected two times in a −Z direction as a result of an N22 block.

Figure 7:
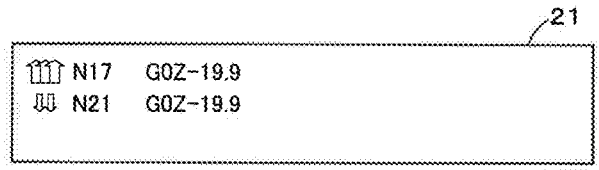
FIG. 7 shows another display example of the processing program in the embodiment of the invention.

Although all of a series of blocks of the processing program are displayed in FIG. 6, attention is focused on a specific kind of factor and blocks to be displayed may be narrowed down, or strength or times of factors may be sorted and displayed as priority order of display as other display examples of the embodiment. For example, FIG. 7 shows a display example in which detected factors are narrowed down to impacts, and the impacts are displayed in descending order of detected times. To display the narrowing down and sorted order, it is possible to provide a user interface which makes it possible to designate priority items of factors to be narrowed down or sorted order from an operating unit possessed by the numerical controller 20.

Figure 8:
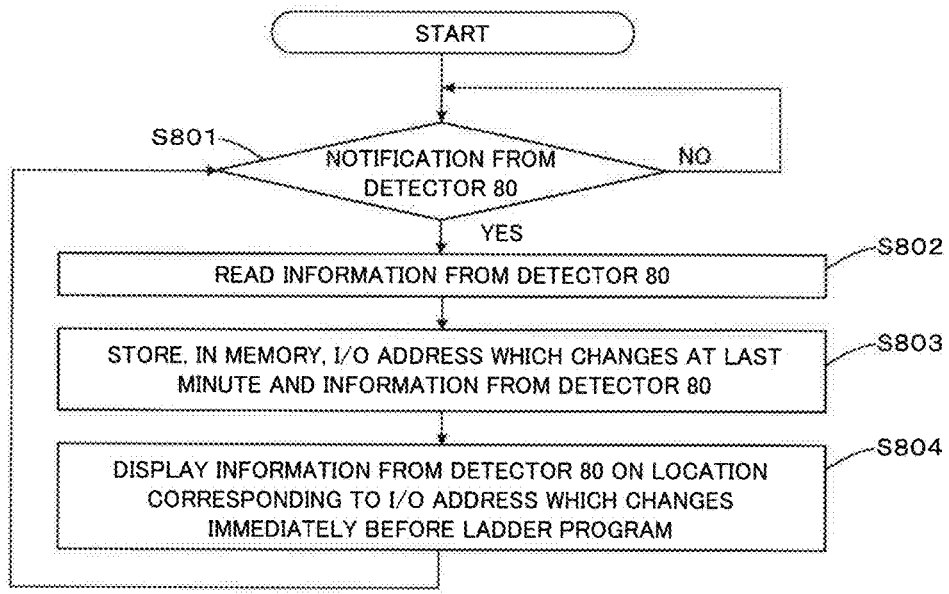
FIG. 8 is a flowchart of display processing of a ladder program in the numerical controller of the embodiment of the invention in association with factor information.

FIG. 8 is a flowchart showing the processing procedure in the numerical controller 20 from the instant when the detector 80 detects noise, power flicker and an impact to the instant when detected information is displayed on a location corresponding to a display location of a ladder program.

If the numerical controller 20 receives notification from the detector 80 which detects noise, power flicker and an impact (S801), the numerical controller 20 accesses the detector 80 and acquires the detected information (S802). The acquire factor information is stored in the memory (not shown) as detection data in association with an I/O address which is changed immediately before notification is received from the detector 80 (S803). If the numerical controller 20 receives display operation instructions of a malfunction factor from an operator, the numerical controller 20 displays the detected factor on a location corresponding to a display location of the I/O address of the ladder program in the display section 21 based on information of detection data stored in the memory (S804).

Here, the I/O address with which information acquired from the detector 80 is associated is an I/O address which is operated immediately before notification is received from the detector 80. Like the case of the processing program, it is possible to employ a configuration that delay produced from the instant when the ladder program is processed to the instant when notification from the detector 80 is received is taken into consideration, and the factor information is stored in association with a plurality of addresses of I/O operated before predetermined time from an I/O address which is operated at the last minute.

To realize such processing, the numerical controller 20 should temporarily store an executed ladder program in the memory only for predetermined time. The temporarily storing time is set in the numerical controller 20, but as the time becomes shorter, it is possible to more narrow down the I/O address of the ladder program which becomes a cause of noise, power flicker and or impact.

Figure 9:
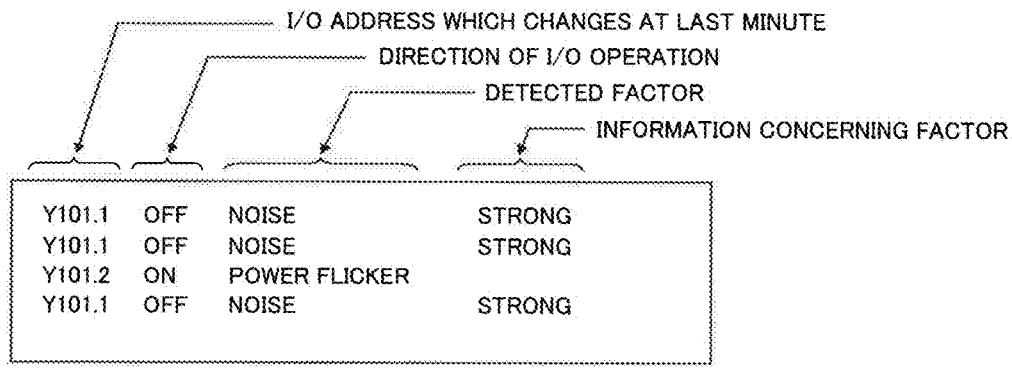
FIG. 9 shows an example of detection data with respect to the ladder program in the embodiment of the invention.

FIG. 9 shows an example of detection data when detected factor information is stored together with an I/O address which is changed at the last minute as a result of ladder processing. Information concerning factors such as an I/O address which is changed at the last minute, a direction of I/O operation, a detected factor and strength of noise is included in the detection data. It is found that in detection data shown in FIG. 9, strong noise is detected whenever an address Y101.1 is executed (three times in FIG. 9).

Figures 10, 11:
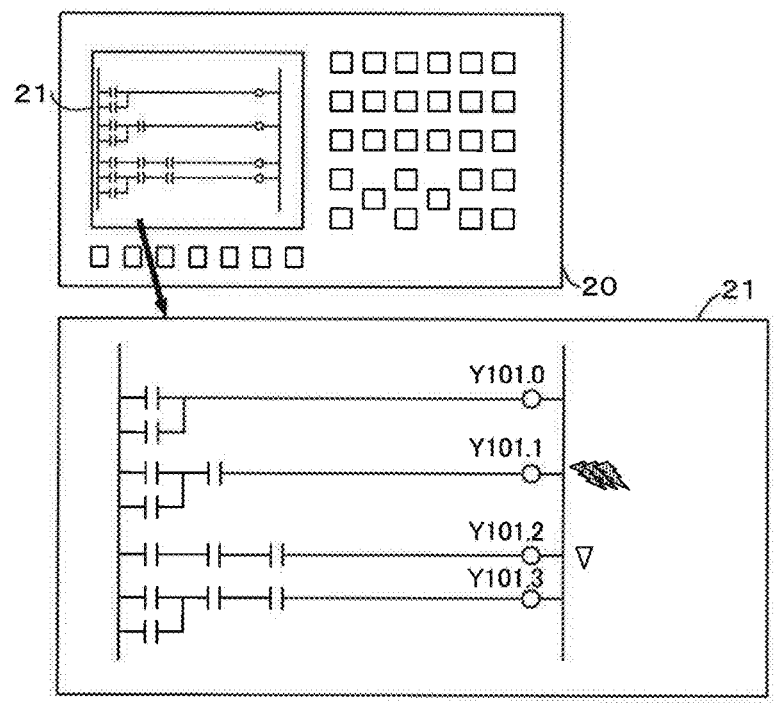
FIG. 10 shows a display example of the ladder program in the embodiment of the invention.
FIG. 11 shows a display example of an I/O list in the embodiment of the invention.
Figure 12:
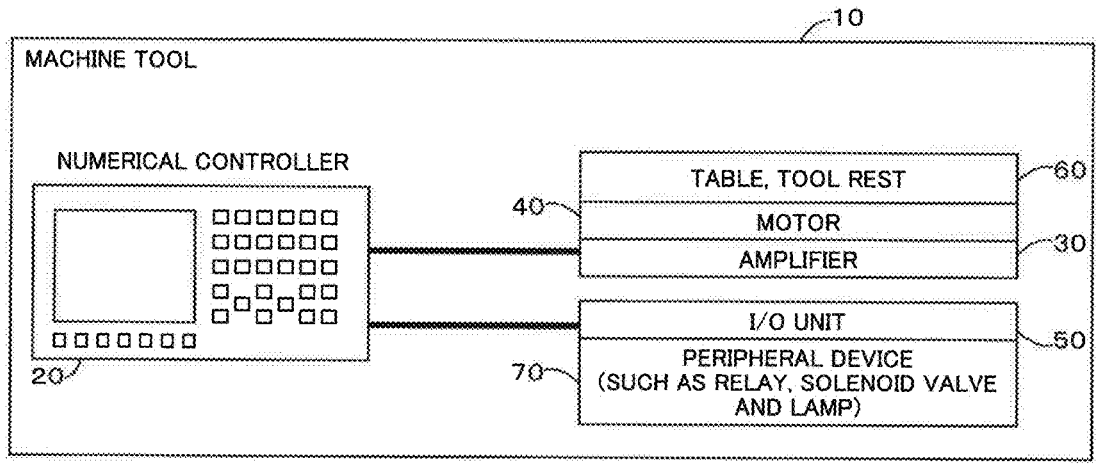
FIG. 12 shows a configuration of a machine tool in a conventional technique.
Figure 13:
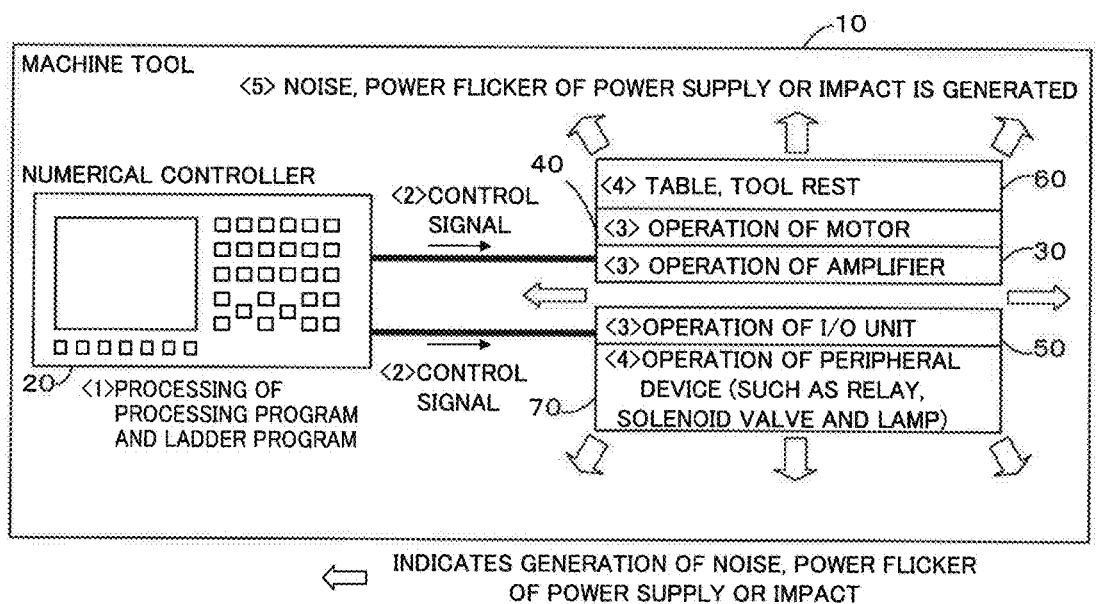
FIG. 13 shows a flow in which a malfunction factor is generated in the conventional technique.

FIG. 10 shows a display example when a ladder program is displayed on the display section 21 based on the detection data shown in FIG. 9. In this display example, marks showing detected factors are displayed on locations corresponding to display locations of the corresponding I/O address of the ladder program to the marks. This display is not limited to this format only if it is possible to grasp immediately after which I/O is operated, the detected factor is generated. For example, a factor may be displayed in a superposed manner on a block, or in a speech balloon manner. In FIG. 10, as marks showing factors, detection of noise is shown with a thunder mark, strength is shown with size of the thunder mark, detection times are shown with the number of thunder marks, detection of power flicker is shown with a downward-directed triangle mark, and detection times are shown with the number of the downward-directed triangle marks. Colors of the marks showing the factors show directions of operation of the I/O when the corresponding factors are generated. In the example in FIG. 10, an outline mark means that a factor is generated when the I/O is ON, and a shaded mark means that a factor is generated when the I/O is OFF. According to FIG. 10, it is immediately obvious that strong noise caused when an address Y101.1 is changed to OFF is detected three times, and power flicker caused when an address Y101.2 is changed to ON is detected once.

All of detected factors are displayed together with the ladder program in FIG. 10. Alternatively, as other display examples of the embodiment, only specific kind of factors may be displayed on the ladder program in a narrowing-down manner, or factors may be displayed in the narrowing-down manner such that a display range is limited to a location of the ladder program where a focused factor is generated.

In FIG. 10, the ladder program and marks showing factors are displayed in association with each other. Alternatively, as another display example of the embodiment, marks showing factors may be displayed on a list of inputs and outputs in association with the ladder program. FIG. 11 shows a display example when inputs and outputs are displayed on the display section 21 in a form of a list based on the detection data shown in FIG. 9. In the list of the inputs and outputs also, it is possible to employ a configuration that I/O where a focused factor is generated can be displayed in the narrowing-down manner.

The display method of detection data is not limited to the above-described method, and it is possible to employ a configuration that kinds of noise, power flicker of a power supply and an impact, strength thereof and the detection times thereof are displayed in a user-friendly manner using color, flashing, inversion, emphasis, operation of a mark, a number, a character and the like.

Although the detector 80 is mounted outside the numerical controller 20 in the embodiment, the detector 80 may be incorporated in a circuit in the numerical controller 20. Although the detectors are integrated into one in this example, a plurality of detectors may be used in accordance with factors to be detected.

What is claimed is:

1. A numerical controller for controlling a machine tool based on a processing program, the numerical controller comprising:
a detecting unit configured to detect one or more factors of a plurality of factors that cause a malfunction of the numerical controller that controls the machine tool, wherein causes of the malfunction of the numerical controller detected by the detecting unit include noises, an occurrence of impact, and an amount of times one or more factors of the plurality of factors is detected;
a storing unit configured to store, when the detecting unit detects the one or more factors of the plurality of factors, (i) information of a block of the processing program which is being executed when each detected factor occurred, (ii) each detected factor that caused the malfunction of the numerical controller, and (iii) information about each detected factor in association with each other; and
a display unit configured to display marking information about the one or more detected factors based on each stored detected factor that caused the malfunction of the numerical controller and the stored information about each detected factor, the marking information displayed at a location corresponding to the block of the processing program when each detected factor occurred based on the stored information of the block of the processing program, wherein the displayed marking information is at least one graphical icon, the at least one graphical icon based on the one or more factors of the plurality of factors, thereby providing an improved determination of the cause of malfunction of the numerical controller.

2. The numerical controller according to claim 1, wherein the detecting unit includes a narrowing-down unit configured to narrow down to and display information of the detected factor corresponding to a specific factor.

3. The numerical controller according to claim 1, wherein a size of the at least one graphical icon is based on a strength of each detected factor of the plurality of factors.

4. The numerical controller according to claim 1, wherein a number of the at least one graphical icon is based on the amount of times the one or more factors of the plurality of factors is detected.

5. The numerical controller according to claim 1, including a processor for processing each detected factor causing the malfunction of the numerical controller stored in the storing unit and displaying each detected factor on the display unit.

6. A numerical controller for controlling a machine tool based on a ladder program, the numerical controller comprising:
a detecting unit configured to detect one or more factors of a plurality of factors that cause a malfunction of the numerical controller that controls the machine tool, wherein causes of the malfunction of the numerical controller detected by the detecting unit include noises, an occurrence of impact, and an amount of times one or more factors of the plurality of factors is detected;
a storing unit configured to store, when the detecting unit detects the one or more factors of the plurality of factors, (i) information of an I/O address of the ladder program which changes immediately before each factor is detected, (ii) each detected factor that caused the malfunction of the numerical controller, and (iii) information about each detected factor in association with each other; and
a display unit configured to display marking information about the one or more detected factors based on each stored detected factor that caused the malfunction of the numerical controller and the stored information about each detected factor, the marking information displayed at a location corresponding to the I/O address of the ladder program which changed immediately before each factor was detected based on the stored information of the I/O address of the ladder program, wherein the displayed marking information is at least one graphical icon, the at least one graphical icon based on the one or more factors of the plurality of factors, thereby providing an improved determination of the cause of malfunction of the numerical controller.

7. The numerical controller according to claim 6, wherein the detecting unit includes a narrowing-down unit configured to narrow down to and display information of the detected factor corresponding to a specific factor.

8. The numerical controller according to claim 6, wherein a size of the at least one graphical icon is based on a strength of each detected factor of the plurality of factors.

9. The numerical controller according to claim 6, wherein a number of the at least one graphical icon is based on the amount of times the one or more factors of the plurality of factors is detected.

10. The numerical controller according to claim 6, including a processor for processing each detected factor causing the malfunction of the numerical controller stored in the storing unit and displaying each detected factor on the display unit.

11. A numerical controller for controlling a machine tool based on a ladder program, the numerical controller comprising:
a detecting unit configured to detect one or more factors of a plurality of factors that cause a malfunction of the numerical controller that controls the machine tool, wherein causes of the malfunction of the numerical controller detected by the detecting unit include noises, an occurrence of impact, and an amount of times one or more factors of the plurality of factors is detected;
a storing unit configured to store, when the detecting unit detects the one or more factors of the plurality of factors, (i) information of an I/O address which changes immediately before each factor is detected, (ii) each detected factor that caused the malfunction of the numerical controller, and (iii) information about each detected factor in association with each other; and
a display unit configured to display marking information about the one or more detected factors based on each stored detected factor that caused the malfunction of the numerical controller and the stored information about each detected factor, the marking information displayed at a location corresponding to the I/O address of an I/O list which changed immediately before each factor was detected based on the stored information of the I/O address, wherein the displayed marking information is at least one graphical icon, the at least one graphical icon based on the one or more factors of the plurality of factors, thereby providing an improved determination of the cause of malfunction of the numerical controller.

12. The numerical controller according to claim 11, wherein the detecting unit includes a narrowing-down unit configured to narrow down to and display information of the detected factor corresponding to a specific factor.

13. The numerical controller according to claim 11, wherein a size of the at least one graphical icon is based on a strength of each detected factor of the plurality of factors.

14. The numerical controller according to claim 11, wherein a number of the at least one graphical icon is based on the amount of times the one or more factors of the plurality of factors is detected.

15. The numerical controller according to claim 11, including a processor for processing each detected factor causing the malfunction of the numerical controller stored in the storing unit and displaying each detected factor on the display unit.

\* \* \* \* \*